(12) United States Patent
Jia

(10) Patent No.: US 10,914,230 B2
(45) Date of Patent: Feb. 9, 2021

(54) TURBOCHARGER SYSTEM, COMPRESSOR SYSTEM THAT FORMS PART THEREOF, AND METHOD OF CONTROLLING AIR FLOW TO AN ENGINE

(71) Applicant: LITENS AUTOMOTIVE PARTNERSHIP, Woodbridge (CA)

(72) Inventor: Zhengjie Jia, Woodbridge (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 0 days.

(21) Appl. No.: 16/494,837

(22) PCT Filed: Mar. 19, 2018

(86) PCT No.: PCT/CA2018/050332
§ 371 (c)(1),
(2) Date: Sep. 17, 2019

(87) PCT Pub. No.: WO2018/165772
PCT Pub. Date: Sep. 20, 2018

(65) Prior Publication Data
US 2020/0040808 A1 Feb. 6, 2020

Related U.S. Application Data

(60) Provisional application No. 62/472,992, filed on Mar. 17, 2017, provisional application No. 62/536,299, filed on Jul. 24, 2017.

(51) Int. Cl.
*F02B 33/44* (2006.01)
*F02B 37/10* (2006.01)

(52) U.S. Cl.
CPC .............. *F02B 33/44* (2013.01); *F02B 37/10* (2013.01)

(58) Field of Classification Search
CPC .......... F02B 33/44; F02B 37/12; F02B 37/16; F02B 37/18; F02B 37/183; F02B 37/225;
(Continued)

(56) References Cited

U.S. PATENT DOCUMENTS 3,020,901 A * 2/1962 Cook .................. F02D 9/00
123/559.1
4,222,240 A * 9/1980 Castellano .............. F02B 37/16
60/611

(Continued)

FOREIGN PATENT DOCUMENTS

WO WO2005064134 A1 7/2005

OTHER PUBLICATIONS

International Search Report & Written Opinion dated Jun. 26, 2018 and issued in connection with PCT/CA2018/050332.

*Primary Examiner* — Jesse S Bogue
*Assistant Examiner* — Loren C Edwards
(74) *Attorney, Agent, or Firm* — Millman IP Inc.

(57) ABSTRACT

In an aspect a method is provided for controlling air flow to an internal combustion engine, comprising: providing a in turbocharger and a compressor that is driven by the turbocharger; driving rotation of a turbine of the turbocharger using exhaust gas from the engine; driving rotation of an impeller of the compressor to generate pressurized air for the engine; sending pressurized air from a pressurized air storage chamber to the internal combustion engine if the pressurized air generated by the impeller is sufficiently low; and sending pressurized air from the compressor to the pressurized air storage chamber for storage therein if the pressurized air generated by the impeller is sufficiently high.

17 Claims, 5 Drawing Sheets

(58) Field of Classification Search
CPC .......... F02B 37/24; F02B 21/00; F02B 21/02; F02D 23/00; F04D 29/46; F04D 27/0215; F04D 13/16
See application file for complete search history.

(56) References Cited

U.S. PATENT DOCUMENTS

2009/0217898 A1   9/2009   Gokhale et al.
2012/0198837 A1   8/2012   Medina
2012/0297769 A1   11/2012   Gerum

* cited by examiner

TURBOCHARGER SYSTEM, COMPRESSOR SYSTEM THAT FORMS PART THEREOF, AND METHOD OF CONTROLLING AIR FLOW TO AN ENGINE

CROSS-REFERENCE

This application claims the benefit of U.S. Provisional Application No. 62/472,992 filed Mar. 17, 2017, and U.S. Provisional Application No. 62/536,299 filed Jul. 24, 2017. The contents of these applications are incorporated by reference herein.

FIELD

This disclosure generally relates to turbochargers, and more particularly, to a methods and systems that improve turbocharger performance.

BACKGROUND

Turbochargers are well-known devices for increasing the amount of power produced by an internal combustion engine in a vehicle. However, some turbochargers suffer from certain problems such as lag (also referred to as 'turbo lag'), which refers to the unacceptably long time required by some turbochargers to meaningfully enhance the engine's power when the vehicle is accelerated while the engine is at low RPM.

In an attempt to reduce the severity of turbo lag, some companies have developed relatively complex systems for adjusting the geometry of the turbine on a turbo. Others have developed twin-turbochargers which employ two volutes. Still others have developed twin-chargers, which employ both a turbocharger and a supercharger. Additionally, systems have been proposed that employ a separate compressor that is driven by an electric motor. The compressor provides pressurized air to the exhaust stream to boost the amount of gas driving the turbocharger when the engine is operating at relatively low RPM and would suffer from lag.

Some of the systems mentioned above, such as those that vary the turbocharger's geometry, involve components that can be delicate, yet which must operate in environments reaching 950 degrees C. or even 1050 degrees C. Many of the systems mentioned above employ significant additional componentry relative to a standard fixed geometry, single-volute turbocharger, and therefore represent significant cost increases over a standard turbocharger.

There is, therefore, a continuing need for improvements in turbocharger performance in order to address problems such as lag, and/or other problems.

SUMMARY

In an aspect, a compressor system is provided for use with a turbocharger, including a compressor, which includes a compressor housing having a main compressor inlet, a main compressor outlet, a storage air inlet and a storage air outlet. The compressor further includes an impeller that is rotatable in the compressor housing to generate pressurized air. The impeller is operatively connected to a turbine of the turbocharger so as to be driven by the turbine. The compressor further includes a diverter having an upstream end and a downstream end, wherein the diverter is pivotable between a first diverter position in which the diverter provides a first restriction to flow out from the compressor housing, and in which the diverter forms at least a portion of a volute around at least a portion of the impeller. The volute has a cross-sectional area that increases progressively from the upstream end of the diverter to the downstream end of the diverter, and a second diverter position in which the diverter provides a second restriction to flow out from the main compressor outlet that is greater than the first restriction. The compressor further includes a diverter biasing member that urges the diverter towards the second diverter position.

The compressor system further includes a pressurized air storage chamber, and a storage air fluid passage arrangement positioned to fluidically connect the pressurized air storage chamber to the storage air inlet and the storage air outlet. When pressurized air generated by the impeller is sufficiently high, the pressurized air drives movement of the diverter to the first diverter position, which causes air flow from the pressurized air storage chamber through the storage air inlet to be prevented and which causes air flow from the compressor to the pressurized air storage chamber through the storage air outlet to be permitted. When pressurized air generated by the impeller is sufficiently low, the diverter biasing member drives movement of the diverter to the second diverter position, which causes air flow from the pressurized air storage chamber through the storage air inlet to be permitted and which causes air flow from the compressor to the pressurized air storage chamber through the storage air outlet to be prevented.

In another aspect, a turbocharger system is provided and includes a turbocharger, including a turbocharger housing and a turbine that is rotatable in the turbocharger housing. The turbocharger system further includes a compressor, including a compressor housing having a main compressor inlet, a main compressor outlet, a storage air inlet and a storage air outlet; an impeller that is rotatable in the compressor housing to generate pressurized air, wherein the impeller is operatively connected to the turbine of the turbocharger so as to be driven by the turbine; a diverter having an upstream end and a downstream end, wherein the diverter is pivotable between a first diverter position in which the diverter provides a first restriction to flow out from the compressor housing, and in which the diverter forms at least a portion of a volute around at least a portion of the impeller, wherein the volute has a cross-sectional area that increases progressively from the upstream end of the diverter to the downstream end of the diverter, and a second diverter position in which the diverter provides a second restriction to flow out from the main compressor outlet that is greater than the first restriction; and a diverter biasing member that urges the diverter towards the second diverter position. The turbocharger system further includes a pressurized air storage chamber; and a storage chamber storage air fluid passage arrangement positioned to fluidically connect the pressurized air storage chamber to the storage air inlet and the storage air outlet. When pressurized air generated by the impeller is sufficiently high, the pressurized air drives movement of the diverter to the first diverter position, which causes air flow from the pressurized air storage chamber through the storage air inlet to be prevented and which causes air flow from the compressor to the pressurized air storage chamber through the storage air outlet to be permitted. When pressurized air generated by the impeller is sufficiently low, the diverter biasing member drives movement of the diverter to the second diverter position, which causes air flow from the pressurized air storage chamber through the storage air inlet to be permitted and which causes air flow from the compressor to the pressurized air storage chamber through the storage air outlet to be prevents.

In yet another aspect, a compressor system is provided for use with a turbocharger, and includes a compressor, including a compressor housing having a main compressor inlet, a main compressor outlet, a storage air inlet and a storage air outlet; an impeller that is rotatable in the compressor housing about an impeller axis and having an impeller inlet configured for drawing in air from the main compressor inlet during rotation of the impeller, and an impeller outlet configured for discharging pressurized air in a generally radial direction into an impeller outlet receiving chamber of the compressor housing, positioned radially outside the impeller for transport of pressurized air from the impeller outlet to the main compressor outlet, wherein the impeller is operatively connected to a turbine of the turbocharger so as to be driven by the turbine; a diverter having an upstream end and a downstream end, wherein the diverter is pivotable between a first diverter position in which the diverter provides a first restriction to flow out from the compressor housing, and in which the diverter forms at least a portion of the impeller outlet receiving chamber around at least a portion of the impeller and is substantially flush with a portion of the impeller outlet receiving chamber immediately upstream from the diverter, such that the impeller outlet receiving chamber has a cross-sectional area that increases progressively from the upstream end of the diverter to the downstream end of the diverter, and a second diverter position in which the diverter provides a second restriction to flow out from the main compressor outlet that is greater than the first restriction; and a diverter biasing member that urges the diverter towards the second diverter position. The compressor system further includes a pressurized air storage chamber; and a storage air fluid passage arrangement positioned to fluidically connect the pressurized air storage chamber to the storage air inlet and the storage air outlet. When pressurized air generated by the impeller is sufficiently high, the pressurized air drives movement of the diverter to the first diverter position, which causes air flow from the pressurized air storage chamber through the storage air inlet to be prevented and which causes air flow from the compressor to the pressurized air storage chamber through the storage air outlet to be permitted. When pressurized air generated by the impeller is sufficiently low, the diverter biasing member drives movement of the diverter to the second diverter position, which causes air flow from the pressurized air storage chamber through the storage air inlet to be permitted and which causes air flow from the compressor to the pressurized air storage chamber through the storage air outlet to be prevented.

In yet another aspect, a turbocharger system is provided and includes a turbocharger, including a turbocharger housing; and a turbine that is rotatable in the turbocharger housing. The turbocharger system further includes a compressor, including a compressor housing having a main compressor inlet, a main compressor outlet, a storage air inlet and a storage air outlet; an impeller that is rotatable in the compressor housing about an impeller axis and having an impeller inlet configured for drawing in air from the main compressor inlet during rotation of the impeller, and an impeller outlet configured for discharging pressurized air in a generally radial direction into an impeller outlet receiving chamber of the compressor housing, positioned radially outside the impeller for transport of pressurized air from the impeller outlet to the main compressor outlet, wherein the impeller is operatively connected to a turbine of the turbocharger so as to be driven by the turbine; a diverter having an upstream end and a downstream end, wherein the diverter is pivotable between a first diverter position in which the diverter provides a first restriction to flow out from the compressor housing, and in which the diverter forms at least a portion of the impeller outlet receiving chamber around at least a portion of the impeller and is substantially flush with a portion of the impeller outlet receiving chamber immediately upstream from the diverter, such that the impeller outlet receiving chamber has a cross-sectional area that increases progressively from the upstream end of the diverter to the downstream end of the diverter, and a second diverter position in which the diverter provides a second restriction to flow out from the main compressor outlet that is greater than the first restriction and a diverter biasing member that urges the diverter towards the second diverter position. The turbocharger system further includes a pressurized air storage chamber; and a storage air fluid passage arrangement positioned to fluidically connect the pressurized air storage chamber to the storage air inlet and the storage air outlet. When pressurized air generated by the impeller is sufficiently high, the pressurized air drives movement of the diverter to the first diverter position, which causes air flow from the pressurized air storage chamber through the storage air inlet to be prevented and which causes air flow from the compressor to the pressurized air storage chamber through the storage air outlet to be permitted. When pressurized air generated by the impeller is sufficiently low, the diverter biasing member drives movement of the diverter to the second diverter position, which causes air flow from the pressurized air storage chamber through the storage air inlet to be permitted and which causes air flow from the compressor to the pressurized air storage chamber through the storage air outlet to be prevented.

In another aspect, a method is provided for controlling air flow to an internal combustion engine, comprising:

providing a turbocharger and a compressor that is driven by the turbocharger;

driving rotation of a turbine of the turbocharger using exhaust gas from the engine;

driving rotation of an impeller of the compressor to generate pressurized air for the engine;

sending pressurized air from a pressurized air storage chamber to the internal combustion engine if the pressurized air generated by the impeller is sufficiently low; and sending pressurized air from the compressor to the pressurized air storage chamber for storage therein if the pressurized air generated by the impeller is sufficiently high.

BRIEF DESCRIPTION OF THE DRAWINGS

The foregoing and other aspects of the invention will be better appreciated having regard to the attached drawings, wherein.

DETAILED DESCRIPTION OF EXAMPLE EMBODIMENTS

Figure 1:
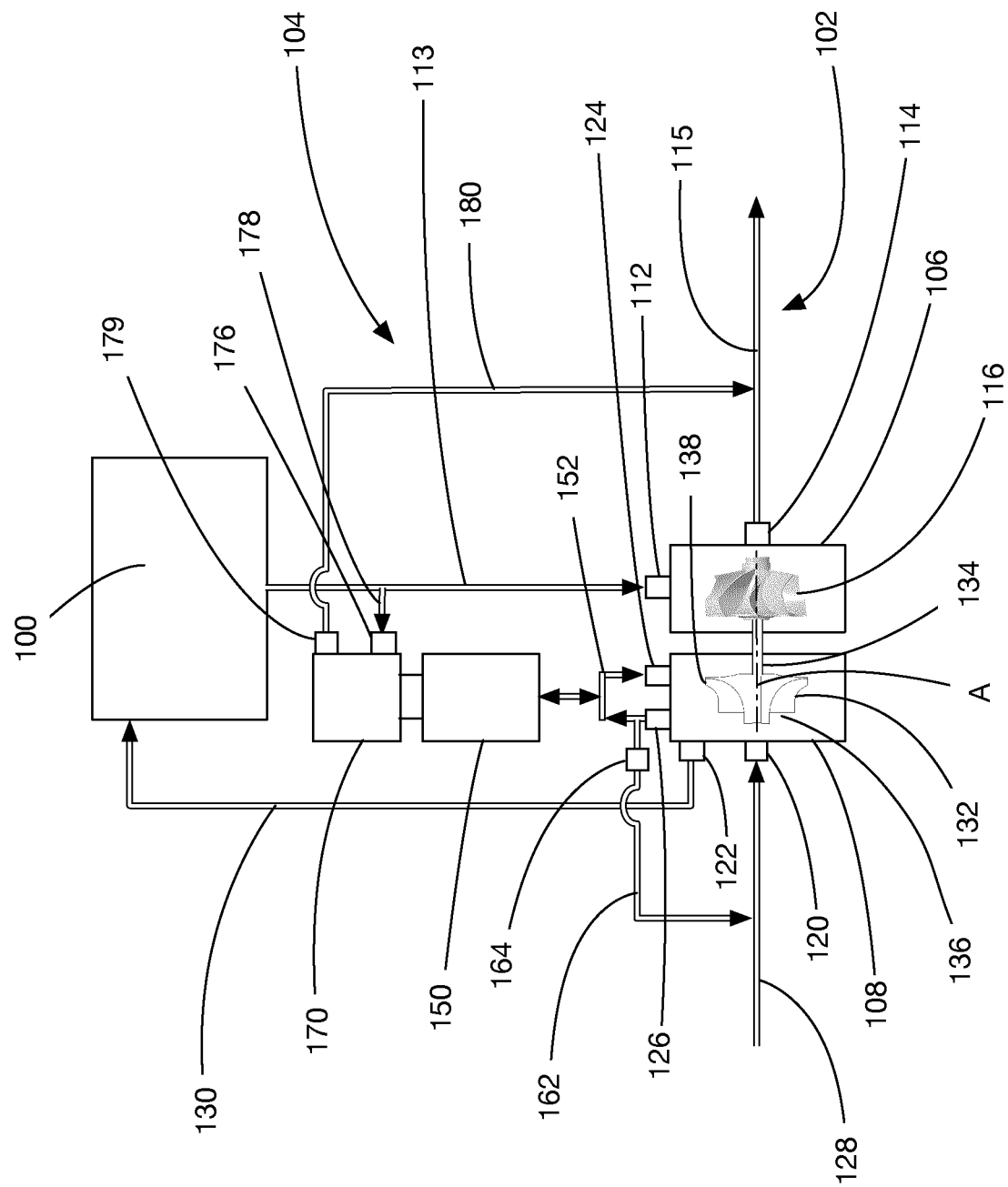
FIG. 1 is a schematic view of an engine including a turbocharger system in accordance with an embodiment of the present disclosure.

Reference is made to FIG. 1, which schematically shows an internal combustion engine 100 for a vehicle. The engine 100 may be any suitable kind of engine, such as a gasoline engine or a diesel engine.

The engine 100 receives air and fuel (e.g. gasoline or diesel fuel) into its cylinders and combusts the fuel to generate power. The engine 100 has an exhaust conduit system shown at 102. Schematically the exhaust conduit system 102 is represented as a single conduit, however it will be understood that one or more portions of the exhaust conduit system 102 may be in the form of a plurality of conduits operating in parallel. In the exhaust conduit system 102.

A turbocharger system 104 is provided in accordance with an embodiment of the present disclosure. The turbocharger system 104 includes, among other things, a turbocharger 106 and a compressor 108. In some embodiments, the turbocharger system 104 improves the performance of the engine 100 relatively inexpensively, without the need to vary the geometry of the turbocharger 106, without the need for additional control systems and electric motors, (although some embodiments can employ such technologies).

The turbocharger 106 includes a turbocharger housing 110 having a turbocharger inlet 112 positioned to receive exhaust gas from an upstream exhaust gas conduit 113 of the exhaust conduit system 102, and a turbocharger outlet 114 positioned to discharge exhaust gas into a downstream exhaust gas conduit 115 of the exhaust conduit system 102. The turbocharger 106 further includes a turbine 116 that is positioned in the turbocharger housing 110 for receiving the exhaust gas and converting kinetic energy from the exhaust gas into rotational kinetic energy in the turbine 116.

The compressor 108 includes a compressor housing 118 having a main compressor inlet 120, a main compressor outlet 122, a storage air inlet 124 and a storage air outlet 126. The main compressor inlet 120 is positioned to receive inlet air from an upstream inlet air conduit shown at 128. The main compressor outlet 122 is positioned to discharge inlet air from the compressor 108 into a downstream inlet air conduit 130, which transports the inlet air towards the engine 100.

The compressor 108 further includes an impeller 132 that is rotatable in the compressor housing 118 about an impeller axis A to generate pressurized air. The impeller 132 is operatively connected to the turbine 116 of the turbocharger 106 so as to be driven by the turbine 118. In the specific example, the turbine 116 and the impeller 132 are both mounted to a common shaft 134 so that the turbine 116 and the impeller 132 are rotationally fixed to one another.

Figure 2:
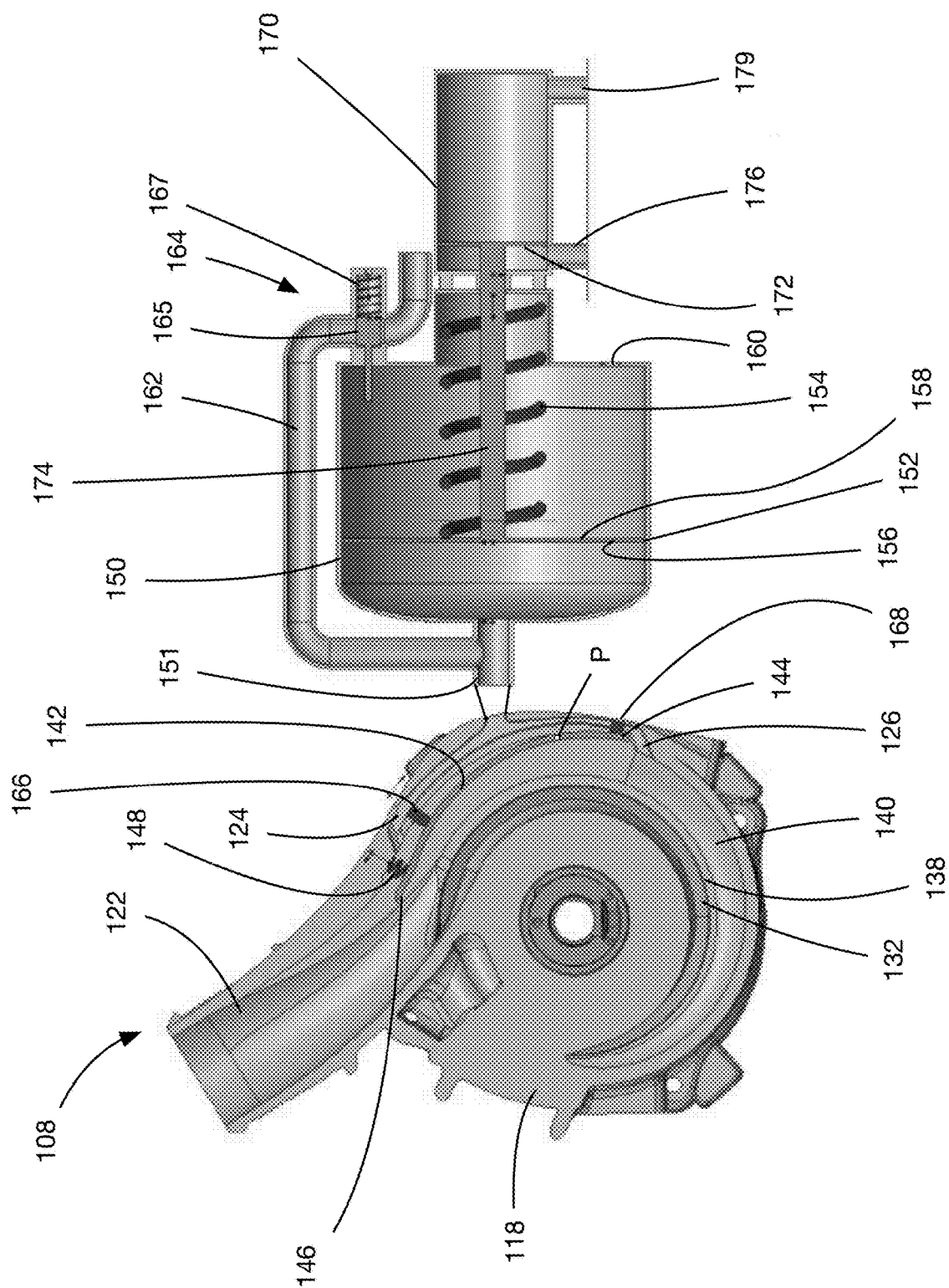
FIG. 2 is a sectional elevation view of a compressor system that is part of the turbocharger system shown in FIG. 1, wherein a pressure member in a pressurized air storage chamber that is part of the compressor system is at a first position.

The impeller 132 has an impeller inlet 136 configured for drawing in air from the main compressor inlet 120 during rotation of the impeller 132, and an impeller outlet 138 configured for discharging pressurized air in a generally radial direction into an impeller outlet receiving chamber 140 (shown in FIG. 2) of the compressor housing 118. The impeller outlet receiving chamber 140 is positioned radially outside the impeller 132 for transport of pressurized air from the impeller outlet 138 to the main compressor outlet 122.

The compressor 108 further includes a diverter 142 that has an upstream end 144 and a downstream end 146. The diverter is pivotable between a first diverter position (FIGS. 3-5) in which the diverter 142 provides a first restriction to flow out from the compressor housing 118, and in which the diverter 142 forms at least a portion of the impeller outlet receiving chamber 140 around at least a portion of the impeller 132, and a second diverter position (FIG. 2) in which the diverter 142 provides a second restriction to flow out from the main compressor outlet that is greater than the first restriction.

Figure 3:
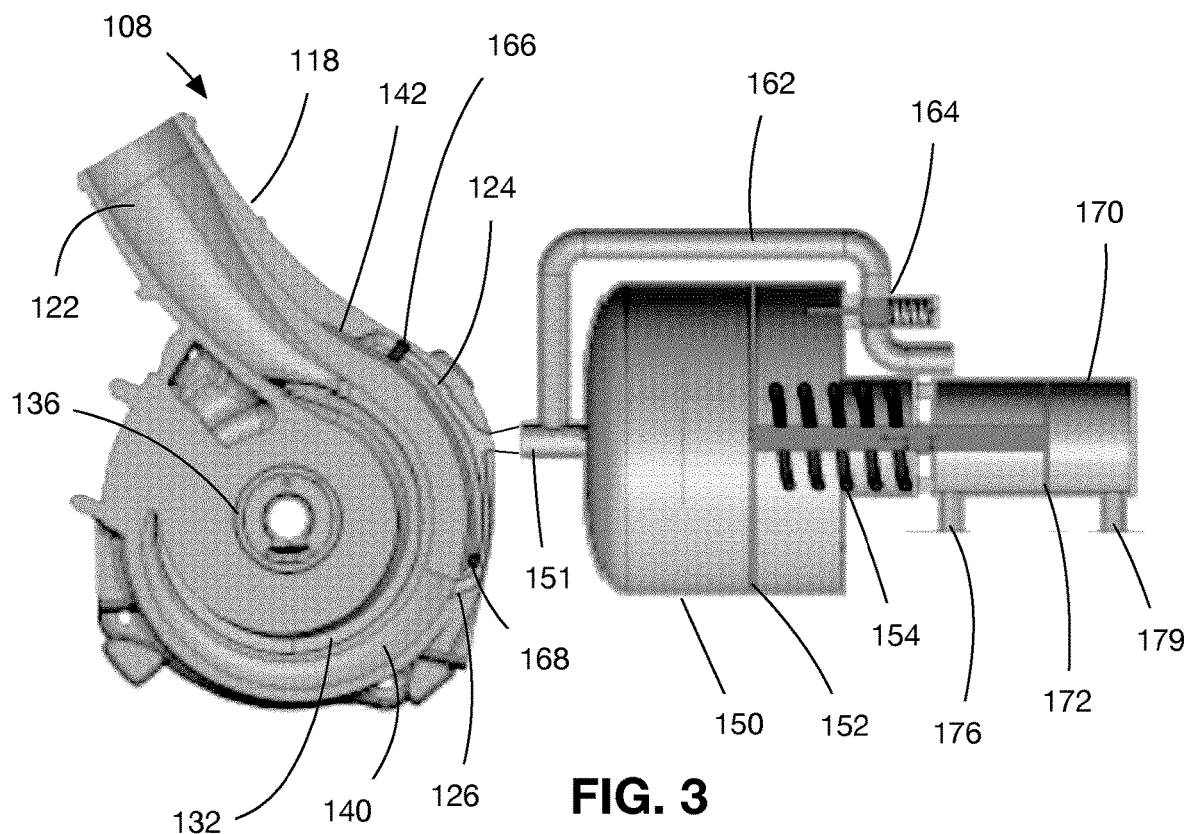
FIG. 3 is another sectional elevation view of the compressor system shown in FIG. 2, wherein the pressure member in the pressurized air storage chamber is at a second position.
Figure 4:
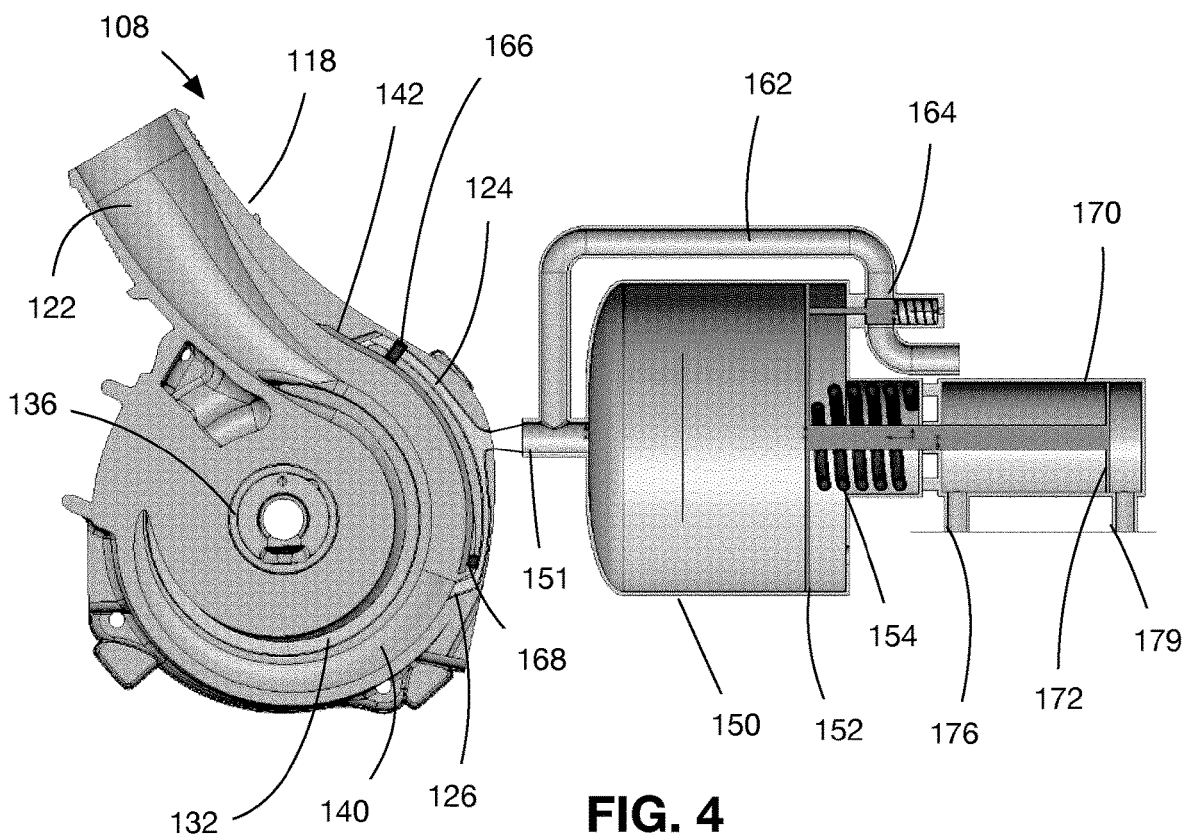
FIG. 4 is another sectional elevation view of the compressor system shown in FIG. 2, wherein the pressure member in the pressurized air storage chamber is at a third position.
Figure 5:
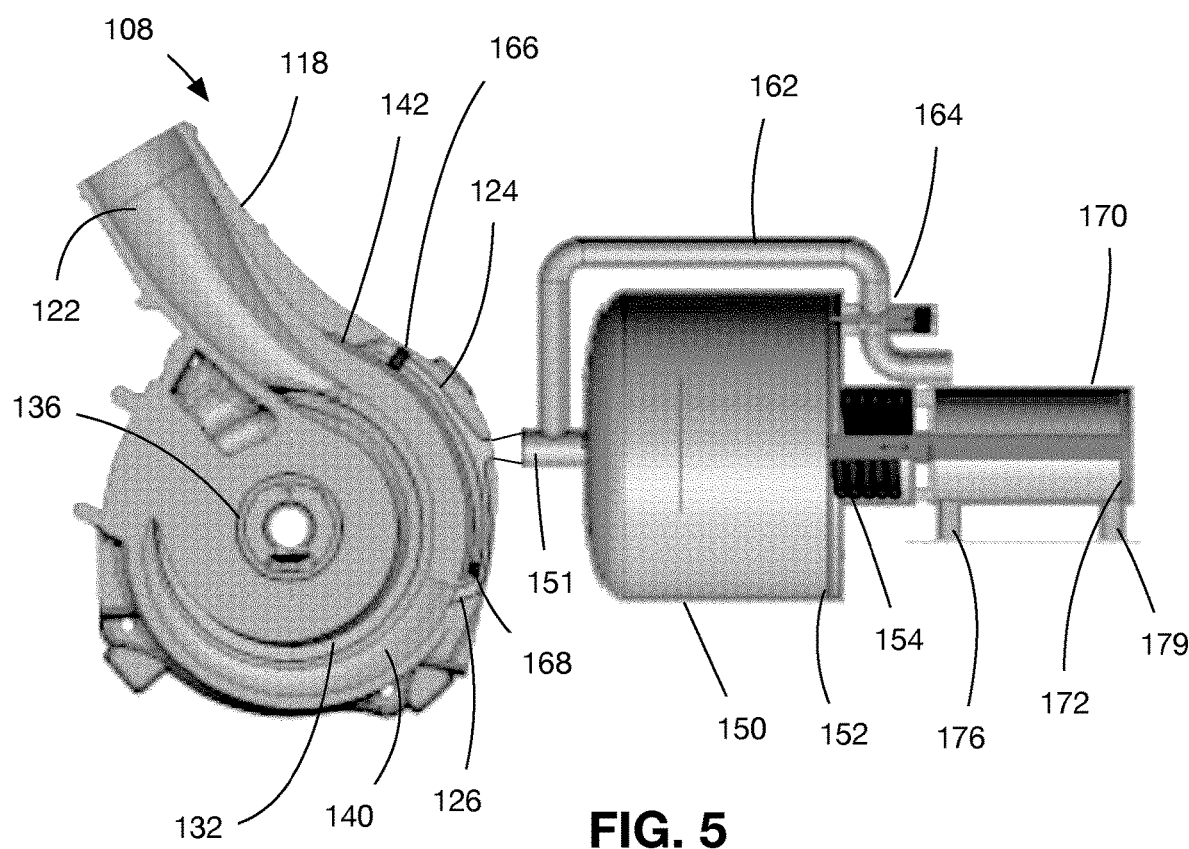
FIG. 5 is another sectional elevation view of the compressor system shown in FIG. 2, wherein the pressure member in the pressurized air storage chamber is at a fourth position.

In some embodiments, when the diverter 142 is in the first diverter position, the diverter 142 is optionally substantially flush with a portion of the impeller outlet receiving chamber 140 immediately upstream from the diverter 142 (as can be seen in FIGS. 3-5). In some embodiments, when the diverter 142 is in the first diverter position the impeller outlet receiving chamber 140 has a cross-sectional area that increases progressively from the upstream end 144 of the diverter 142 to the downstream end 146 of the diverter 142. In some embodiments, when the diverter 142 is in the first diverter position, the diverter 142 may be said to form at least a portion of a volute around at least a portion of the impeller 132 (as shown in FIGS. 3-5).

For the purpose of the present disclosure, the term 'flush' means that, aside from a relatively small valley that provides clearance, and an opening to an air flow passage to be described further below, the shape of the face of the diverter that faces the impeller 132 is substantially continuous with the shape of the portion the impeller outlet receiving chamber 140 immediately upstream from the diverter 142.

The diverter 142 may be similar to the diverter 40 shown in PCT publication WO 2017/124198, the contents of which are incorporated herein by reference in their entirety. While the '198 publication describes a pump for liquid, it will be understood by one skilled in the art that the incorporation of a diverter that is arranged in this way, wherein it pivots proximate its upstream end, is positioned in an impeller outlet receiving chamber, and forms a portion of a volute in a housing in which the impeller rotates, will provide some similar advantages, whether the fluid being moved by the impeller is a liquid or a gas.

The compressor 108 optionally further includes a diverter biasing member 148 that urges the diverter 142 towards the second diverter position. The diverter biasing member 148 in the embodiment shown in the figures is a helical compression spring, however any other suitable type of biasing member may be used.

A pressurized air storage chamber 150 is provided. A storage air fluid passage arrangement 151 is provided and is positioned to fluidically connect the pressurized air storage chamber 150 to the storage air inlet 124 and the storage air outlet 126. In the embodiment shown, the storage air inlet 124 and the storage air outlet 126 both connect to a common fluid passage that is connected fluidically to the pressurized air storage chamber 50.

The pressurized air storage chamber 150 has a pressure member 152 therein and a pressure member biasing member 154 that applies a biasing force on the pressure member 152 to urge the pressure member 152 to drive pressurized air out from the pressurized air storage chamber 150. The biasing force applied by the pressure member biasing member 154 on the pressure member 152 causes the air in the pressurized air storage chamber 150 to be pressurized. The pressure member 152 may act as a piston and may be substantially sealingly engaged with the wall of the pressurized air storage chamber 150, such that a front side 156 of the pressure member 152 faces the pressurized air and in part defines the volume in which the pressurized air resides. On a rear side 158 of the pressure member 152, the pressurized air storage chamber 150 may be at atmospheric pressure due to the presence of a vent aperture 160 in a suitable wall of the pressurized air storage chamber 150. While the pressure member 152 may be substantially sealingly engaged with the wall of the pressurized air storage chamber 150 as noted above, it is possible for a small amount of leakage to occur therebetween, with relatively little loss of efficiency.

The pressure member biasing member 154 in the embodiment shown in the figures is a helical compression spring, however any other suitable type of biasing member may be used.

A recirculation conduit 162 and a recirculation valve 164 may be provided with the pressurized air storage chamber 150. The recirculation valve 164 permits discharge of pressurized air from the pressurized air storage chamber 150 based at least in part on pressure in the pressurized air storage chamber 150. The recirculation conduit 162 is positioned to transport discharged pressurized air from the pressurized air storage chamber 150 to a point upstream from the impeller 132 (e.g. to a point on the conduit 128 as shown in FIG. 1, or directly at the main compressor inlet 120). This can help increase the pressure of the pressurized air generated by the impeller 132, which will increase the pressure of the pressurized air in the pressurized air storage chamber 150 as explained further below.

The recirculation valve 164 may have any suitable structure, such as a valve element 165 that is movable (e.g. linearly slidable) between an open position (FIG. 5) and a closed position (FIGS. 2 and 3) and a valve element biasing member 167 that urges the valve element towards the closed position. The valve element biasing member 167 may be a compression spring, as shown, or may be any other suitable type of biasing member.

As can be seen, the storage air inlet 124 is provided proximate the downstream end 146 of the diverter 142 and the storage air outlet 126 is provided proximate the upstream end 144 of the diverter 142. The diverter 142 is pivotally mounted to the compressor housing 118 via a pin connection, for pivotal motion of the diverter 142 about a pivot axis P. The diverter 142 has a first diverter valve member 166 thereon and a second diverter valve member 168 thereon. When the diverter 142 is in the first diverter position, the first diverter valve member 166 blocks air flow through the storage air inlet 124, but the second diverter valve member 168 permits air flow from the compressor 108 to the pressurized air storage chamber 150. When the diverter is in the second diverter position, the first diverter valve member 166 permits air flow through the storage air inlet 124 thereby permitting air flow from the pressurized air storage chamber 150 to a point in the air flow path downstream from the impeller, but the second diverter valve member 168 blocks air flow from the compressor 108 to the pressurized air storage chamber 150.

The pivot axis P is closer to the upstream end 144 than to the downstream end 146. A length L1 is the distance of the pivot axis P to the upstream end 144 of the diverter 142 and a length L2 is the distance of the pivot axis P to the downstream end 146 of the diverter 142. The difference in lengths between length L1 and length L2, and the spring rate of the diverter biasing member 148, each control the pressure at which pressurized air in the impeller outlet receiving chamber 140 pushes the diverter 142 to the first diverter position.

When pressurized air generated by the impeller 132 is sufficiently high, the pressurized air drives movement of the diverter 142 to the first diverter position, which causes air flow from the pressurized air storage chamber 150 through the storage air inlet 124 to be prevented and which causes air flow from the compressor 108 to the pressurized air storage chamber 150 through the storage air outlet 126 to be permitted. When pressurized air generated by the impeller 108 is sufficiently low, the diverter biasing member 148 drives movement of the diverter 142 to the second diverter position, which causes air flow from the pressurized air storage chamber 150 through the storage air inlet 124 to be permitted and which causes air flow from the compressor 108 to the pressurized air storage chamber 150 through the storage air outlet 126 to be prevented.

Optionally, the pressure member 152 is a primary pressure member and there is also a secondary drive chamber 170 having a secondary pressure member 172 that is connected to the primary pressure member 152 (e.g. by a rod 174). The secondary drive chamber 170 has a secondary drive chamber inlet 176 and a secondary drive chamber inlet conduit 178 is positioned to fluidically connect an inlet side of the turbocharger 106 to the secondary drive chamber inlet 176 so as to expose the secondary pressure member 172 to exhaust gas, so as to urge the secondary pressure member 172 to urge the primary pressure member 152 (via the fixed connection therebetween via the rod 174), in a first direction, which is a direction that is against the biasing force of the pressure member biasing member 154. The secondary pressure member 172 may be substantially sealingly engaged with the wall of the secondary drive chamber 170 in similar manner to the engagement of the primary pressure member 152 with the wall of the pressurized air storage chamber 150.

Optionally, the secondary drive chamber 170 has a secondary drive chamber outlet 179. A secondary drive chamber outlet conduit 180 is positioned to fluidically connect an outlet side of the turbocharger 106 to the secondary drive chamber outlet 180. The secondary pressure member is movable to a waste gate position at least in part by the exhaust gas in the secondary drive chamber 170 at which point the secondary drive chamber outlet 179 is exposed to the exhaust gas in the secondary drive chamber 170 so as to permit a flow of exhaust gas from the secondary drive chamber 170 back to the exhaust system downstream from the turbine 116. By virtue of the secondary drive chamber 170, the turbocharger system shown in the figures uses pressure from the exhaust gas to directly assist in encouraging air flow into the pressurized air storage chamber 150. By contrast a typical waste gate in a turbocharger of the prior art simply opens a valve based on exhaust gas pressure so that some exhaust gas bypasses the turbocharger without doing useful work.

Turning now to the sequence of states shown in FIGS. 2-5, when the engine is at low RPM and there is relatively low pressure in the exhaust system, which means that the turbocharger turbine 116 is turning at relatively low RPM, such that relatively low pressure is being generated by the compressor 108. As a result, the diverter 142 will move to the second position shown in FIG. 2, so as to permit pressurized air from the pressurized air storage chamber 150 to be introduced into the air flow being discharged from the compressor 108. As a result, the air flow is at a useful pressure so that the engine 100 can make good power when needed by the occupant even though it is at low RPM.

As the RPM of the engine increases and the speed and energy of the exhaust gas increases, the RPM of the turbocharger turbine 116 increases, such that the compressor 108 generates sufficient pressure that the pressure in the impeller outlet receiving chamber 140 is sufficiently high to overcome the biasing member 148 and move the diverter 142 to the first position as shown in FIG. 3. As shown, pressure in the chamber 150 and the chamber 170 are not yet sufficient to open the recirculation valve 164. As engine RPM and turbocharger RPM climb, pressure generated by the compressor 108 increases and the exhaust gas pressure increases, such that the pressure member 152 moves to the point where it directly engages and actuates the valve element 165 of the recirculation valve 164. As a result, continued increase in pressure in the chamber 150 and in the exhaust system cause a corresponding increase in the opening of the valve 164 and a corresponding increase in the amount of air being recirculated from the pressurized air storage chamber 150 to the compressor inlet 120, as shown in FIG. 4. If pressures in the chamber 150 and the chamber 170 continue to increase, the secondary pressure member 172 moves to a position in which it exposes the secondary drive chamber outlet 179 to the exhaust gas in the secondary drive chamber 170 so as to permit a flow of exhaust gas from the secondary drive chamber 170 back to the exhaust system downstream from the turbine 116.

It will be noted that the above structure can operate passively, thereby not requiring an electronic control system or sensors in order to operate. It is a self-regulating system that reduces turbo lag and increases the amount of energy that is recovered from the exhaust gas without the need to introduce expensive structures into the exhaust gas flow, and without the need for sensors or a control system (although such technologies could be used if advantageous).

Tuning of the performance of the turbocharger system described herein may be achieved by selecting the lengths L1 and L2, the spring rates of all the biasing members used herein, the areas of the diverter 142, the pressure member 152 and the pressure member 172, and other parameters.

Figure 6:
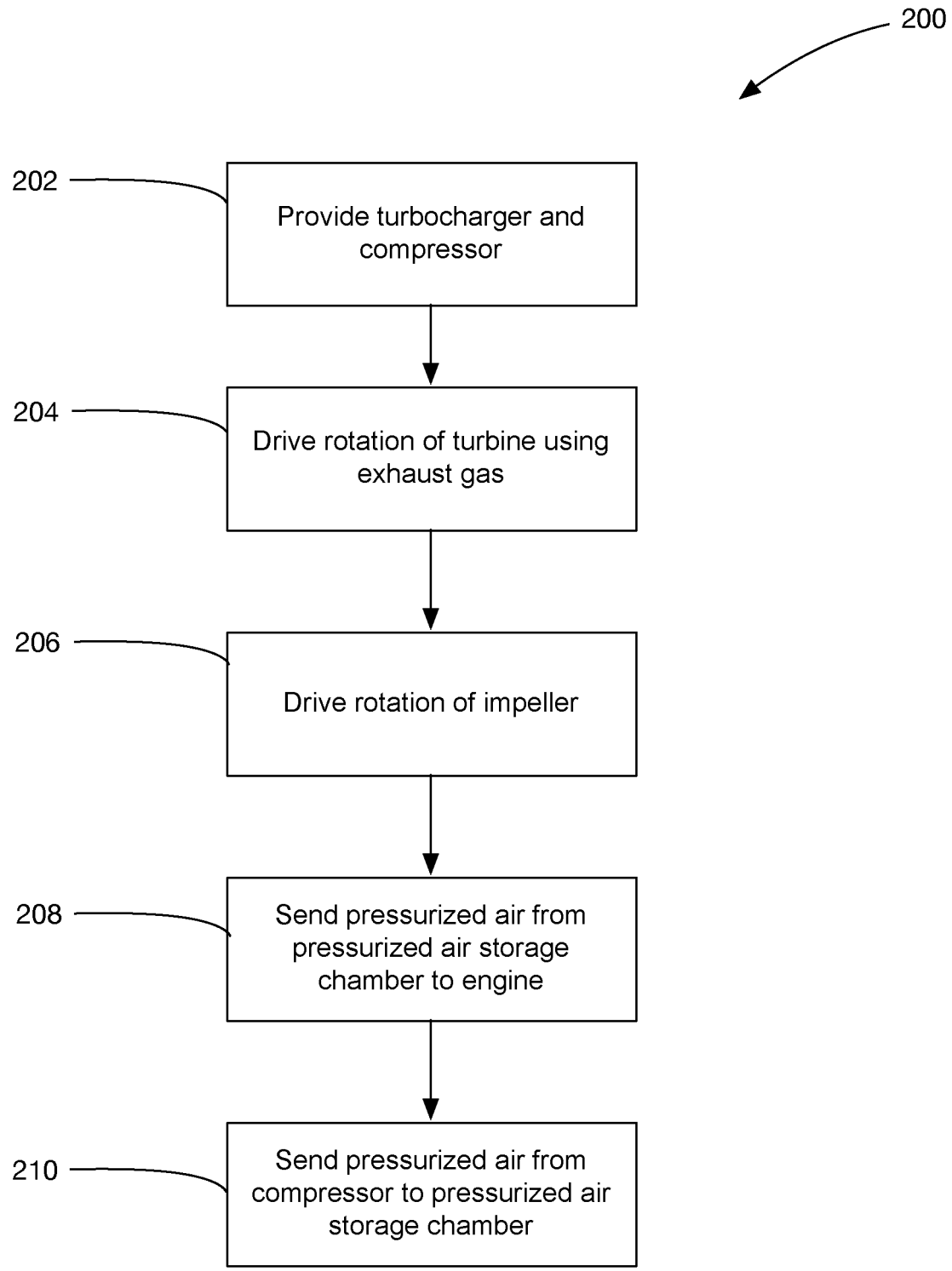
FIG. 6 is a flow diagram illustrating a method of controlling air flow to an engine, in accordance with an embodiment of the present disclosure.

Reference is made to FIG. 6, which illustrates a method 200 of controlling air flow to an engine such as engine 100 (i.e. an internal combustion engine), comprising: step 202, which includes providing a turbocharger and a compressor that is driven by the turbocharger; step 204, which includes driving rotation of a turbine of the turbocharger using exhaust gas from the engine; step 206, which includes driving rotation of an impeller of the compressor to generate pressurized air for the engine; step 208, which includes sending pressurized air from a pressurized air storage chamber to the internal combustion engine if the pressurized air generated by the impeller is sufficiently low; and step 210 which includes sending pressurized air from the compressor to the pressurized air storage chamber for storage therein if the pressurized air generated by the impeller is sufficiently high. It will be noted that the method 200 may be performed using the structures described herein, but could alternatively be performed using structures (e.g. a turbocharger and a compressor) that are entirely different than those shown in the figures. There need not be biasing members to passively urge a diverter, a recirculation valve or a pressure member. Alternatively other means may be used, including but not limited to a control system, though biasing members such as those shown are advantageous in that they are less expensive.

Other advantages and features will be understood by a person of skill in the art upon review of the present disclosure.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A compressor system for use with a turbocharger, comprising:
   a compressor, including
      a compressor housing having a main compressor inlet, a main compressor outlet, a storage air inlet and a storage air outlet;
      an impeller that is rotatable in the compressor housing about an impeller axis and having an impeller inlet configured for drawing in air from the main compressor inlet during rotation of the impeller, and an impeller outlet configured for discharging a pressurized air flow in a generally radial direction into an impeller outlet receiving chamber of the compressor housing, positioned radially outside the impeller for transport of the pressurized air flow from the impeller outlet to the main compressor outlet, wherein the impeller is operatively connected to a turbine of the turbocharger so as to be driven by the turbine;
   a diverter having an upstream end and a downstream end, wherein the diverter is pivotable between a first diverter position in which the diverter provides a first restriction to an air flow out from the compressor housing, and in which the diverter forms at least a portion of the impeller outlet receiving chamber around at least a portion of the impeller and is substantially flush with a portion of the impeller outlet receiving chamber immediately upstream from the diverter, such that the impeller outlet receiving chamber has a cross-sectional area that increases progressively from the upstream end of the diverter to the downstream end of the diverter, and a second diverter position in which the diverter provides a second restriction to the air flow out from the compressor housing that is greater than the first restriction;
   and a diverter biasing member that urges the diverter towards the second diverter position;
   a pressurized air storage chamber; and
   a storage air fluid passage arrangement positioned to fluidically connect the pressurized air storage chamber to the storage air inlet and the storage air outlet,
   wherein, when a pressure of a pressurized air flow generated by the impeller is sufficiently high, the pressurized air flow generated by the impeller drives a movement of the diverter to the first diverter position, which causes an air flow from the pressurized air storage chamber through the storage air inlet to be prevented and which causes an air flow from the compressor to the pressurized air storage chamber through the storage air outlet to be permitted,
   and wherein, when the pressure of the pressurized air flow generated by the impeller is sufficiently low, the diverter biasing member drives a movement of the diverter to the second diverter position, which causes the air flow from the pressurized air storage chamber through the storage air inlet to be permitted and which causes the air flow from the compressor to the pressurized air storage chamber through the storage air outlet to be prevented.

2. The compressor system as claimed in claim 1, wherein, when the diverter is in the first diverter position, the diverter directly blocks the air flow from the pressurized air storage chamber through the storage air inlet and directly permits the air flow from the compressor to the pressurized air storage chamber through the storage air outlet, and wherein, when the diverter is in the second diverter position, the diverter directly permits the air flow from the pressurized air storage chamber through the storage air inlet and directly blocks the air flow from the compressor to the pressurized air storage chamber through the storage air outlet.

3. The compressor system as claimed in claim 2, wherein the pressurized air storage chamber has a pressure member therein and a pressure member biasing member that urges the pressure member to drive a volume of pressurized air that is in the pressurized air storage chamber out from the pressurized air storage chamber.

4. The compressor system as claimed in claim 3, further comprising a recirculation conduit and a recirculation valve, wherein the recirculation valve opens to permit discharge of the volume of pressurized air from the pressurized air storage chamber based at least in part on pressure in the pressurized air storage chamber, wherein the recirculation conduit is positioned to transport the volume of pressurized air from the pressurized air storage chamber to a point upstream from the impeller.

5. The compressor system as claimed in claim 1, wherein the diverter is pivotally mounted to the compressor housing at a pivot point that is closer to the upstream end than to the downstream end.

6. A turbocharger system, comprising:
a turbocharger, including
a turbocharger housing; and
a turbine that is rotatable in the turbocharger housing;
a compressor, including
a compressor housing having a main compressor inlet, a main compressor outlet, a storage air inlet and a storage air outlet;
an impeller that is rotatable in the compressor housing about an impeller axis and having an impeller inlet configured for drawing in air from the main compressor inlet during rotation of the impeller, and an impeller outlet configured for discharging a pressurized air flow in a generally radial direction into an impeller outlet receiving chamber of the compressor housing, positioned radially outside the impeller for transport of the pressurized air flow from the impeller outlet to the main compressor outlet, wherein the impeller is operatively connected to the turbine so as to be driven by the turbine;
a diverter having an upstream end and a downstream end, wherein the diverter is pivotable between a first diverter position in which the diverter provides a first restriction to an air flow out from the compressor housing, and in which the diverter forms at least a portion of the impeller outlet receiving chamber around at least a portion of the impeller and is substantially flush with a portion of the impeller outlet receiving chamber immediately upstream from the diverter, such that the impeller outlet receiving chamber has a cross-sectional area that increases progressively from the upstream end of the diverter to the downstream end of the diverter, and a second diverter position in which the diverter provides a second restriction to the air flow out from the compressor housing that is greater than the first restriction;
and a diverter biasing member that urges the diverter towards the second diverter position;
a pressurized air storage chamber; and
a storage air fluid passage arrangement positioned to fluidically connect the pressurized air storage chamber to the storage air inlet and the storage air outlet,
wherein, when a pressure of a pressurized air flow generated by the impeller is sufficiently high, the pressurized air flow generated by the impeller drives a movement of the diverter to the first diverter position, which causes an air flow from the pressurized air storage chamber through the storage air inlet to be prevented and which causes an air flow from the compressor to the pressurized air storage chamber through the storage air outlet to be permitted,
and wherein, when the pressure of the pressurized air flow generated by the impeller is sufficiently low, the diverter biasing member drives a movement of the diverter to the second diverter position, which causes the air flow from the pressurized air storage chamber through the storage air inlet to be permitted and which causes the air flow from the compressor to the pressurized air storage chamber through the storage air outlet to be prevented.

7. The turbocharger system as claimed in claim 6, wherein, when the diverter is in the first diverter position, the diverter directly blocks the air flow from the pressurized air storage chamber through the storage air inlet and directly permits the air flow from the compressor to the pressurized air storage chamber through the storage air outlet, and wherein, when the diverter is in the second diverter position, the diverter directly permits the air flow from the pressurized air storage chamber through the storage air inlet and directly blocks the air flow from the compressor to the pressurized air storage chamber through the storage air outlet.

8. The turbocharger system as claimed in claim 7, wherein the pressurized air storage chamber has a pressure member therein and a pressure member biasing member that applies a biasing force on the pressure member to drive a volume of pressurized air that is in the pressurized air storage chamber out from the pressurized air storage chamber, wherein, during the air flow from the compressor to the pressurized air storage chamber through the storage air outlet the pressure member is urged in a first direction against the biasing force of the pressure member biasing member.

9. The turbocharger system as claimed in claim 8, further comprising a recirculation conduit and a recirculation valve, wherein the recirculation valve opens to permit discharge of the volume of pressurized air that is in the pressurized air storage chamber from the pressurized air storage chamber through the recirculation conduit upon reaching a sufficient pressure in the pressurized air storage chamber.

10. The turbocharger system as claimed in claim 9, wherein the recirculation conduit fluidically connects the pressurized air storage chamber to the compressor inlet.

11. The turbocharger system as claimed in claim 8, wherein the pressure member is a primary pressure member and wherein the turbocharger system further comprises a secondary drive chamber having a secondary pressure member that is connected to the primary pressure member, and having a secondary drive chamber inlet and a secondary drive chamber inlet conduit positioned to fluidically connect an inlet side of the turbocharger to the secondary drive chamber inlet so as to expose the secondary pressure member to exhaust gas so as to urge the secondary pressure member to urge the primary pressure member in the first direction.

12. The turbocharger system as claimed in claim 11, wherein the secondary drive chamber has a secondary drive chamber outlet and wherein a secondary drive chamber outlet conduit is positioned to fluidically connect an outlet side of the turbocharger to the secondary drive chamber outlet, and wherein the secondary pressure member is movable to a waste gate position at least in part by the exhaust gas in the secondary drive chamber, at which point the secondary drive chamber outlet is exposed to the exhaust gas in the secondary drive chamber so as to permit a flow of exhaust gas from the secondary drive chamber back to the turbocharger system downstream from the turbine.

13. The turbocharger system as claimed in claim 12, further comprising a recirculation conduit and a recirculation valve, wherein the recirculation valve opens to permit discharge of the volume of pressurized air that is in the pressurized air storage chamber from the pressurized air storage chamber through the recirculation conduit upon reaching a sufficient pressure in the pressurized air storage chamber.

14. The turbocharger system as claimed in claim 6, wherein the diverter is pivotally mounted to the compressor housing at a pivot point that is closer to the upstream end than to the downstream end.

15. A method of controlling air flow to an engine that is an internal combustion engine, comprising:
   providing a turbocharger and a compressor that is driven by the turbocharger;
   driving rotation of a turbine of the turbocharger using exhaust gas from the engine;
   driving rotation of an impeller of the compressor to generate a flow of pressurized air for the engine;
   sending a first volume of pressurized air from a pressurized air storage chamber to the internal combustion engine if a pressure of the flow of pressurized air generated by the impeller is sufficiently low; and
   sending a flow of pressurized air from the compressor to the pressurized air storage chamber for storage therein if the pressure of the flow of pressurized air generated by the impeller is sufficiently high,
   wherein the pressurized air storage chamber has a primary pressure member therein and a pressure member biasing member that applies a biasing force on the primary pressure member to drive a second volume of pressurized air that is in the pressurized air storage chamber out from the pressurized air storage chamber, wherein, during the flow of pressurized air from the compressor to the pressurized air storage chamber the primary pressure member is urged in a first direction against the biasing force of the pressure member biasing member,
   and wherein the method further comprises urging the primary pressure member in the first direction by engagement of exhaust gas from upstream from the turbine with a secondary pressure member that is connected to the primary pressure member.

16. The method as claimed in claim 15, further comprising discharging a third volume of pressurized air that is in the pressurized air storage chamber from the pressurized air storage chamber if the pressure in the pressurized air storage chamber is sufficiently high.

17. The method as claimed in claim 15, further comprising discharging a third volume of pressurized air that is in the pressurized air storage chamber from the pressurized air storage chamber to a point upstream of the impeller if the pressure therein in the pressurized air storage chamber is sufficiently high.

* * * * *